United States Patent Office 3,595,848
Patented July 27, 1971

3,595,848
PROCESS FOR THE STABLE AQUEOUS MONOMER DISPERSION POLYMERIZATION AND MIXED POLYMERIZATION OF VINYL CHLORIDE
Herbert Reinecke and Johann Braun, Burghausen, Upper Bavaria, Germany, assignors to Wacker-Chemie GmbH, Munich, Germany
No Drawing. Filed Jan. 9, 1968, Ser. No. 696,515
Claims priority, application Germany, Jan. 20, 1967, W 43,195
Int. Cl. C08f 1/00, 3/30, 15/24
U.S. Cl. 260—92.8                3 Claims

ABSTRACT OF THE DISCLOSURE

This invention relates to an improvement in the process for the polymerization of a polymerizate containing at least 80% polyvinyl chloride by stable aqueous monomer dispersion polymerization, the said improvement comprising in that at least during part of the polymerization a reflux condensation of the monomer is effected. This process results in faster polymerization times with better control of particle size of the polymerizate.

THE PRIOR ART

The method of employing reflux condensers and refluxing during the polymerization, especially during atmospheric pressure polymerization, of vinyl compounds, is well known in the art. However, until now no reflux condensation has been utilized for the equally well known method of preparing polymerizate and mixed polymerizates of vinyl chloride, when an aqueous stable monomer dispersion, prepared prior to the polymerization, is being polymerized. In these polymerization processes, the dispersion is agitated during the polymerization either not at all or only very slightly by mechanical means, for example, by stirring. Consequently, it was to be expected that the polymerization of the monomer, changed into the vapor phase and then condensed at reflux, with the lack of mechanical agitation sufficient for the complete re-dispersion of the monomer in water, would result in polymerizates with an unacceptable large portion of undesirable polymerizates in the form of pellets, lumps or blocks.

OBJECTS OF THE INVENTION

An object of the invention is a process for the polymerization and mixed polymerization of vinyl chloride by polymerizing an aqueous stable monomer dispersion prepared prior to the polymerization, characterized in that at least during one part of the polymerization a reflux condensation takes place.

Another object of the invention is the development of, in the process for the production of a polymerizate containing at least 80% polyvinyl chloride comprising the steps of preparing a stable aqueous monomer dispersion consisting of (1) monomers selected from the group consisting of vinyl chloride and mixtures of vinyl chloride with up to 20% of olefinically-unsaturated compounds copolymerizable with vinyl chloride, (2) water, (3) monomer-soluble polymerization catalysts, and (4) emulsifiers, heating said stable aqueous monomer dispersion to a temperature between 30° C. and 80° C. for a time sufficient to effect polymerization under at least the saturation pressure of said monomers, and recovering said polymerizate, the improvement which consists in that during at least part of said heating step to effect polymerization, a reflux condensation of said monomer is effected.

These and other objects of the invention will become more apparent as the description thereof proceeds.

DESCRIPTION OF THE INVENTION

It was rather surprising to discover now, that reflux condensation can also be employed during the polymerization according to known processes, whereby an aqueous stable monomer dispersion prepared prior to the polymerization, consisting of vinyl chloride or of mixtures of vinyl chloride and monomers polymerizable therewith, is polymerized without useless polymerizates forming thereby. By means of the reflux condensation, a surprisingly significant increase in the rate of the reaction is attained.

Preferably, the reflux condensation should have at least an intensity as measured in that the ratio of the reflux cooling surface to that of the cooling surface in contact with the liquid phase of the polymerization mixture, for example, the cooling surface of the jacket should be 1 to 100 assuming identical heat transfer, coolant, and temperature of the coolant. Preferably, the reflux condensation should at best be so intensive that not more than 50% by weight of the existing monomer would be present in the form of fresh condensate at any time. If the reflux intensity lies below the minimum value indicated, the increase of reaction, obtained by the reflux condensation, is undesirably low. Reflux intensities above the maximum value previously given, are of no significance with regard to the practice of the invention.

The reflux condensation can be effected with any of the known reflux condensation devices chosen at random, as they are used in the art, in connection with low-boiling liquids. Many cooling arrangements for the covers of autoclaves are known, for example, jacketed covers, attached condensers or suspended condensers, all of which can be used. It has been found also to be advantageous, that the reflux condensing device is connected to the conduit of the coolant for the cooling surface in contact with the liquid phase of the polymerization mixtures, for example, of the coolant supply of the usual jacketed cooling of the polymerization-autoclave. If, for example, the cover and walls of the polymerization vessel consist of the same material and exhibit equal thickness, which frequently is the case, the reflux is obtained by a jacketed cover through which the coolant flows. If the cooling surface of the jacketed cover amounts to at least 1% of the cooling surface of the jacket about the walls of the polymerization vessel, the previously indicated preferred minimum intensity of the reflux cooling is obtained. The ratio relationships are very similar with attached condensers or suspended condensers. Consequently, the reflux intensity can be easily adjusted to the desired amount.

Aside from the essentially employment of a reflux condensation according to the invention, all of the known measures can be utilized, as they have been previously utilized for the polymerization and mixed polymerization of vinyl chloride by polymerizing an aqueous stable monomer dispersion prepared prior to the polymerization. These measures are described, for example, in the German Pats. No. 962,834 and No. 1,069,387, in the published German applications No. 1,050,062 and No. 1,076,373, as well as in the British Pat. No. 698,359 and in the U.S. Pat. No. 2,674,585. Preferred, is the process according to the German Pat. No. 1,069,387, whereby, in the preparation of the stable monomer dispersion, the mechanical action on the mixture of the dispersion ingredients is sufficient so that the monomer dispersion, while standing at rest, separates out a small amount of the monomer on its surface.

In the case that mixtures of vinyl chloride and mixed olefinically-unsaturated monomers copolymerizable with vinyl chloride are used as the monomer constituents of the dispersion to be polymerized, the portion of vinyl chloride in such mixtures amounts preferably to at least 80% by weight, based on the total weight of the monomer mixture. Preferably used are olefinically-unsaturated monomers capable of being copolymerizable with vinyl chloride are those which contain only one polymerizable group, and especially the —CH=C= group. For example, the following are mentioned: vinyl bromide, vinylidene chloride, vinyl esters of organic acids such as vinyl formate, vinyl acetate and vinyl benzoate; acryl compounds such as methyl acrylate, methyl methacrylate, as well as unsaturated dicarboxylic acids such as maleic acid, fumaric acid, methylene malonic acid, itaconic acid, citraconic acid or tetrahydrophthalia acid and the mono and di-esters of these acids, such as dimethyl maleate, diethyl maleate and di-n-butyl maleate, mono (2-ethylhexyl) maleate, dimethyl furmarate, diethyl fumarate, di-n-butyl fumarate, di-(2-ethylhexyl-) fumarate and di-lauryl fumarate. Of course, mixtures of more than two monomers can also be used, for example, mixtures of 86% by weight of vinyl chloride, 13% by weight of vinyl acetate and 1% by weight of maleic acid anhydride.

As dispersing agents, the ionogenic and/or non-ionogenic emulsifiers and/or protective colloids can be utilized. Preferably, anion-active emulsifiers are used as ionogenic emulsifiers. For example, the following can be mentioned: alkali metal and, in particular, ammonium salts of fatty acids, such as lauric or palmitic acid; alkali metal and ammonium salts of the acid phosphoric acid alkylesters, such as sodium diethylhexyl acid phosphate, alkali metal and ammonium salts of the acid fatty alcohol sulfuric acid esters, the paraffinsulfonic acids, the alkylnaphthalinsulfonic acids and the sulfosuccinic acid dialkyl esters. Also very suitable are alkali metal and ammonium salts of fatty acids containing epoxy groups, such as ammonium epoxystearate; or the alkali metal and ammonium salts of those products, which can be obtained by the reaction of per acids, for example, peracetic acid with unsaturated fatty acids, for example, oleic or linoleic acid with the formation perhaps of dihydroxystearic acid, and hydroxyacetoxystearic acid; as well as the alkali metal and ammonium salts of the reaction products of per acids with unsaturated hydroxyfatty acids, such as ricinoleic acid. But cation-active emulsifiers such as laurylpyridinium hydrochloride can also be utilized.

As examples for non-ionogenic emulsifiers the following can be mentioned: partial fatty acid esters of polyhydric alcohols such as glycerine monostearate, sorbitol monolaurate or monopalmitate; partial fatty alcohol ethers of polyhydric alcohols; polyoxyethylene ethers of fatty alcohols or aromatic hydroxy compounds; as well as the known polypropyleneoxide-polyethyleneoxide condensation products.

Altogether, the amount of the ionogenic and non-ionogenic emulsifiers utilized is usually about 0.1% to 2% by weight, based on the weight of the monomer or monomers used.

The protective colloids, which can also be employed as dispersing agents, are the organic polymerizates, which are utilized customarily as protective colloids for the polymerization of suspensions (see C. E. Schildknecht, "Polymer Processes," New York, 1956, pages 78 to 81). As examples, the following are mentioned: polyvinyl alcohol, which, if so desired, can contain up to 40% mol of acetyl groups; gelatin and cellulose derivatives such as water-soluble methyl cellulose, carboxymethyl cellulose, hydroxylcellulose; as well as mixed polymerizates of maleic acid or its semi-esters with styrene. The protective colloids are used at amounts of 0.1% to 5% by weight, preferably 0.3% to 2% by weight, based on the weight of the monomer or the monomers.

The polymerization is effected in the usual manner, preferably with the aid of monomer-soluble, free-radical-forming catalysts. As examples for monomer-soluble polymerization catalysts the following can be named: benzoyl peroxide, lauroyl peroxide, 2,4-dichlorobenzoyl peroxide or azoisobuteric acid dinitrile, which can be used advantageously in combination with acetylcyclohexanesulfonyl peroxide or diethylhexyl percarbonate. These monomer-soluble catalysts are utilized preferably at amounts of 0.01% to 5% by weight, advantageously 0.05% to 1% by weight, based on the weight of the monomer or monomers.

The employment of reflux condensation according to the invention makes it possible to use greater amounts of catalysts then has previously been practiced.

Customary polymerization adjuvants, aside from those already mentioned, such as particle size and molecular weight regulators, can be used concomitantly. The quantitative ratio of water to the monomer to be polymerized is not critical. As a rule, the amount of the monomer is 10% to 60%, in particular 20% to 50% of the combined weight of the water and monomer.

The pH of the polymerization mixture is preferably between 4 and 10. The polymerization temperature ranges, preferably, between 30° C. and 80° C. Advantageously, the reaction mixture is not stirred during the process of polymerization. In the case that the mixture is stirred during the polymerization, a speed of rotation of more than 15 to 500 revolutions per minute should not be chosen.

The polymerization can be effected in stages or semi-continuously or continuously. It can be carried out at the saturation pressure of the monomer or monomers, or at increased pressures. The reflux condensation can be employed from the beginning of the polymerization process or commenced during the polymerization process.

From the polymerizates prepared according to the process of the invention, plastisols or organosols can be prepared in known manner by triturating the polymer with softening agents, and, if so desired, with concomitant use of insoluble, or slightly soluble, or swelling organic, volatile and/or nonvolatile diluents. For this purpose, additives customarily utilized in the preparation of plastisols and organosols, such as stabilizers, for example barium-cadmium-soaps, dyes, pigments and fillers, can also be used.

The polymerizates, prepared according to the invention, can be, if so desired, worked up with or without plasticizers in the known thermoplastic manner; that is, by utilizing heat and pressure, for example, by calendering, extrusion, injection molding or press molding, to prepare, for example, disc records and tape records.

The following specific embodiments are illustrative of the practice of the invention. They are, however, not to be deemed limitative in any manner.

The aqueous stable monomer dispersions, employed in the following examples, were prepared prior to the polymerization in that the mixtures of the ingredients of these dispersions were dispersed by pumping, by means of a multi-stage rotary pump at a pressure of 15 atmospheres through a nickel nozzle having 500 apertures each having a diameter of 0.3 mm., whereby the difference between the pressure before the nozzle and the pressure after the nozzle is 11 atmospheres.

EXAMPLE 1

A stable monomer dispersion consisting of:

550 kg. of vinyl chloride
520 kg. of water
30 kg. of a 22% by weight aqueous solution of the ammonium salt of oxidized oleic acid
825 g. of lauroyl peroxide was filled into a tubular jacketed autoclave, having a capacity of 1.4 m.³ and a diameter of 60 cm., without stirrer, provided with a vertical reflux condenser on the cover having a 1 m.² effective cooling surface. Water was passed, as heat transmitting medium or as coolant, through the autoclave jacket and reflux condenser which are connected with one another by a conduit with a shut-off means. The stable monomer dispersion in the autoclave was heated to 48° C. After the exothermic polymerization reaction had been started, the temperature was maintained at 48° C. with water of about 12° C., and the reflux condenser was connected. After approximately 17 hours, the pressure dropped from about 7 atmospheres to about 3.5 atmospheres. After depressurizing the autoclave, a polymerizate dispersion was obtained with a density of 1.147, which corresponds with a solids content of about 44.6% by weight. The over-all waste matter, that is to say the coating on the wall and polymerizate of undesirable size, amounted to only 1.2 kg.

For the purpose of comparison, the working method, described above, was repeated but, with the modification that the reflux condenser was not connected. In this case, the pressure drop of from 7 atmospheres to 3.5 atmospheres occurred only after 20 hours, that means the polymerization duration was longer. The polymerizate dispersion had a density of 1.140, corresponding with a solids content of only 41% by weight, and the total waste amounted to 3.5 kg.

The aqueous solution of the ammonium salt of oxidized oleic acid was prepared in the following manner. At a temperature of 75° C. and within the space of 1½ hours, 86.4 gm. of 50% by weight aqueous hydrogen peroxide were added, dropwise and while stirring, to a mixture consisting of 250 gm. of technical oleic acid, 30 gm. of acetic acid and 7 gm. of 50% by weight aqueous sulfuric acid. After stirring the mixture for 3 hours longer at 75° C., it was washed with water at a temperature of 65° C. After having been dried, the product obtained had the following properties:

Melting point—63° C. (clear melt)
Iodine number—1
Acid number—165
Saponification number—200
Acetyl number—1.51
Epoxy oxygen—0.1%

The product obtained was converted with aqueous ammonia into a 22% by weight solution of the ammonium salt in water.

EXAMPLE 2

A stable monomer dispersion consisting of:

550 kg. of vinyl chloride
550 kg. of water
5.5 kg. of sodium laurylsulfate
550 gm. of lauroyl peroxide was introduced into the autoclave described in Example 1. As heat transmitting medium or as coolant, water was passed through the jacket and reflux condenser. The stable monomer dispersion in the autoclave was heated to 60° C. After the exothermic polymerization had started, the temperature was maintained at 60° C., with water of about 12° C., and the reflux condenser was connected. After 8½ hours the pressure dropped from approximately 10.5 atmospheres to about 3.5 atmospheres.

For purpose of compraison, the working method previously described was repeated with the difference that the reflux condenser was not connected. In this case the internal temperature could not be maintained at 60° C., it increased to above 85° C.

EXAMPLE 3

A stable monomer dispersion consisting of:

480 kg. of vinyl chloride
624 kg. of water
96 kg. of an aqueous, 5% by weight solution of polyvinyl-alcohol with a saponification number of 180
480 gm. of lauroyl peroxide was introduced into a jacketed autoclave equipped with a stirrer. The autoclave had a capacity of 1.5 m.³. The cover of this autoclave also functioned as a reflux condenser and was provided with a jacket. The jacket of the vessel had an effective cooling surface of 7.5 m.², the jacket of the cover had an effective cooling surface of 0.25 m.². Serving as heat transmitting medium or as coolant, water was passed through the reflux condenser then through the jacket. The stirrer was a blade stirrer type, operating at 150 revolutions per minute. The content in the autoclave was heated to 50° C. After the exothermic polymerization had been started, the temperature was maintained at 50° C. by water at about 12° C. After the pressure had dropped to about 3.5 atmospheres from approximately 7.5 atmospheres, a dispersion with a solids content of 37% by weight was obtained.

For the purpose of comparison, the method of operation previously described was repeated but with the difference that the water flowed through the jacket of the autoclave only, that is to say, the reflux condenser was not connected. In this case, the solids content of the dispersion amounted, at identical polymerization duration, only to 33.7%. The size of the particles of the polymerizates was, in the comparison test, as well as in the working method of the invention, 5 to 20 microns.

The preceding specific embodiments are illustrative of the practice of the invention. It is to be understood, however, that other expedients known to those skilled in the art can be employed without departing from the spirit of the invention or the scope of the appended claims.

We claim:

1. In the process for the production of a polymerization containing at least 80% polyvinyl comprising the steps of preparing an aqueous monomer dispersion by mechanical action stable while standing at rest consisting of (1) monomers selected from the group consisting of vinyl chloride and mixtures of vinyl chloride up to 20% of olefinically-unsaturated compounds copolymerizable with vinyl chloride, (2) water, (3) monomer-soluble polymerization catalysts, and (4) emulsifiers, heating said stable aqueous monomer dispersion to a temperature between 30° C. and 80° C. for a time sufficient to effect polymerization, under at least the saturation pressure of said monomers, and recovering said polymerizate, the improvement which consists in that during at least part of said heating step to effect polymerization, a stirring of the polymerization mixture at a speed of rotation of from 0 to 500 revolutions per minute is effected and a reflux condensation of said monomers is effected.

2. The process of claim 1 wherein said reflux condensation has an intensity of at least that, the ratio of the reflux cooling surface to that of the cooling surface in contact with the liquid phase of said stable aqueous monomer dispersion at identical heat transfer, coolant, and temperature of the coolant is 1 to 100, and, at the most, that no more than 50% by weight of said monomers is present at any time in the form of fresh condensate.

3. The process of claim 1 wherein said heating of said stable aqueous monomer dispersion to effect polymerization is conducted in the absence of mechanical stirring.

References Cited

FOREIGN PATENTS 1,385,373   12/1964   France _____ 260—92.8U

JOSEPH L. SCHOFER, Primary Examiner

J. A. DONAHUE, JR., Assistant Examiner

U.S. Cl. X.R.

260—78.5, 80.6, 86.3, 87.1, 87.5, 87.7